US006868042B1

(12) United States Patent
Christman et al.

(10) Patent No.: US 6,868,042 B1
(45) Date of Patent: Mar. 15, 2005

(54) DATA-BASED SIGNAL DEFINITION FOR FREQUENCY DOMAIN ADAPTIVE BEAMFORMING ALGORITHMS

(75) Inventors: Russell A. Christman, Old Lyme, CT (US); Mohamed H. Ahmed, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 37 days.

(21) Appl. No.: 10/214,528

(22) Filed: Aug. 8, 2002

(51) Int. Cl.[7] .................... G01S 15/00
(52) U.S. Cl. .................... 367/119; 367/103
(58) Field of Search .................... 367/103, 119, 367/13; 600/437

(56) References Cited

U.S. PATENT DOCUMENTS 5,251,186 A * 10/1993 Lockwood .................. 367/103
6,058,075 A * 5/2000 Bourdelais .................. 367/103
6,166,689 A * 12/2000 Dickey et al. .............. 342/381
6,332,028 B1 * 12/2001 Marash ...................... 367/119
2002/0015500 A1 * 2/2002 Belt et al. .................. 381/66

* cited by examiner

*Primary Examiner*—Ian J. Lobo
(74) *Attorney, Agent, or Firm*—James M. Kasischke; Michael F. Oglo; Jean-Paul A. Nasser

(57) ABSTRACT

A data-based technique is disclosed that defines the amplitude and phase of acoustic signals for detection as they propagate across an array of sensor elements for each array incident angle of interest. The definitions of the acoustic signals are then used to constrain adaptive noise suppression operating routines from canceling desired acoustic representative of desired incident direction detector. The data-based technique of defining acoustic signals also leads to a greater reduction of noise in directions where signal is not present. The use of this technique within an adaptive-array-beamforming-processor, and more particularly in connection with the provision of data-based steering vectors therefor, results in an improvement in the ability to detect acoustic signals imbedded in noise.

9 Claims, 3 Drawing Sheets

DATA-BASED SIGNAL DEFINITION FOR FREQUENCY DOMAIN ADAPTIVE BEAMFORMING ALGORITHMS

CROSS-REFERENCE TO RELATED APPLICATIONS

This application is with a related patent application Ser. No. 09/922,308 filed Aug. 3, 2001, now abandoned, entitled "CALIBRATION BASED SIGNAL DEFINITION FOR FREQUENCY DOMAIN ADAPTIVE BEAMFORMING SYSTEMS".

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to adaptive-array-beamforming processors and, more specifically, to adaptive-array-beamforming processors having a data-based technique that, relative to prior art, improves the description of the amplitude and phase of acoustic signals, as they propagate across an array of sensor elements, for each array incident angle of interest. The appropriate data-based determination of the acoustic signal is then used to constrain adaptive noise suppression algorithms, such that acoustic signals in the desired incident (or steering) directions are canceled less than that of prior art. In direction where there are no acoustic signals and the noise is largely uncorrelated, the use of data-based signal definitions also reduces noise more than that of prior art. The use of the data-based technique, within an adaptive-array-beamforming processor, results in an improvement in the ability to detect acoustic signals imbedded in noise.

(2) Description of the Prior Art

An adaptive-array-beamforming prior art processor 10 is used to detect acoustic signals imbedded in noise and is generally illustrated in FIG. 1. An array 12 used with the processor 10 consists of several sensor elements that convert acoustic signal pressure waves to voltages and are represented as time series and, more particularly, as time series voltages. For frequency domain algorithms, commonly used in a processor 10, sensor element time series voltages are transformed to frequency bin voltages via well-known analyses, such as Fast Fourier Transformation (FFT) analysis.

The adaptive beamforming, that is, the processor's 10 response, which adapts itself to cancel noise for the particular acoustic signals being received, is then implemented on each frequency bin processed. In operation, the array 12 is steered; that is, the array 12 is constrained by the adaptive-array-beamforming processor from canceling acoustic signals in a steered or desired incident direction. The terms "steered direction" and "desired incident direction" are used herein in an interchangeable manner. The steered direction is defined by a vector of complex numbers, one complex number for each sensor element. For the frequency domain algorithm, a steering vector is required for each frequency bin processed. The constraint for steering the array requires that the sum of the product of the steering vectors and the computed adaptive weights for each sensor element be unity for each frequency bin. The adaptive weight computation, which gives less or near zero significance to all directions other than the steering direction, is well known in the art. The term "actual signal for detection" means a real-world signal encountered by a signal system for the detection thereof. The adaptive-array-beamforming-processor to which the present invention relates is a stage in the signal system prior to the apparatus performing the detection. An example of an "actual signal for detection" in the signal system context of a sonar system used on a naval submarine would be the acoustic signal generated by a torpedo in the course of the torpedo attacking the submarine. The acoustic signal of the torpedo may be imbedded in noise caused by the underwater environment and/or other causes. Such an "actual signal for detection" stands in contradistinction to the artificially generated signals projected toward the array for calibration purposes in the disclosed embodiment of the earlier cited related patent application Ser. No. 09/922,308, wherein the artifical signals are produced by a signal generator (20, FIG. 2 therein) in response to a signal projector controller (22, FIG. 2, therein).

The prior art suffers drawbacks in developing constraints for adaptive-array-beamforming-processors because the prior art assumes free-field propagation of acoustic signals to each sensor element within the array 12. The result is a free-field based steering vector arrangement 14 that is used to disadvantageously constrain the adaptive-array-beamforming-processor by canceling acoustic signals representative of a desired incident direction. For example, with nearby array mounting structure scattering acoustic signals (as well as amplitude and phase variations inherent in sensor element manufacture), the signal amplitude and phase at each sensor element can deviate from free field propagation. This deviation makes the uses of the signal amplitude and phase of each sensor as an error contribution in constraining the adaptive-array-beamforming-processor causing the cancellation of desired acoustic signals. It is desired that means be provided for developing constraints for adaptive-array-beamforming processors that do not cancel the handling of desired acoustic signals as much as that of prior art so that increased signal-to-noise at the output of the beamforming processors results.

SUMMARY OF THE INVENTION

Therefore, it is an object of the present invention to provide means for developing constraints for adaptive-array-beamforming-processors that, relative to prior art, provide more accurate signal definitions to the array so that desired information contained in desired acoustic signals will be better preserved.

It is another object of the present invention to provide means for preventing undesirable canceling of desired signals when performing adaptive noise suppression techniques.

It is still another object of the present invention to provide an adaptive array beamforming processor that preserves desired acoustic signals, while increasing noise suppression in non-signal directions.

Further, it is an object of the present invention to provide a data-based technique that enables a better definition of acoustic signal propagation to each array sensor element under operating conditions.

Accordingly, the current invention provides a method for defining amplitude and phase parameters of acoustic signals that propagate across sensor elements of an array of an adaptive beamforming processor for each array incident angle of interest. The method employs a steering and summing circuit of the conventional beamforming-processor and involves as the input the actual signal for detection, when present, combined with noise. The method further comprises routing the output of each sensor element as a first input to an adaptive filter having a second input and having a representative output, and to the steering and summing circuit of the conventional beamforming-processor having a representative output interrelated to the representative output of each adaptive filter. The method continues by subtracting the representative output of each adaptive filter from the interrelated and representative output of the steering and summing circuit, so as to produce a representative error signal that is respectively routed to the second input of the adaptive filter. Again, the method continues until each error signal is substantially zero, which yields a converged and respective filter quantity $f_n$ for each sensor element. The method further continues by inverting each $f_n$ quantity so as to provide representative data-based steering vectors for the beamforming-processors.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENTS

As discussed in the "Background" section, for an adaptive-array-beamforming processor to function optimally, the in-situ acoustic signal vector, associated with the circuitry for steering the related array, for any given incident angle and frequency bin must be known well in order to obtain accurate results. The in-situ acoustic signal vector needs to be defined by quantities that are largely free of error, otherwise inaccurate control of the array of the adaptive beamforming processor will result. More particularly, if the quantities are not known accurately, the constraining algorithm used to control the steering circuit of the adaptive-beamforming-processor, will possibly cancel desired acoustic signals, or equivalently treat desired signals as noise. The present invention provides for a solution for this problem.

The present invention provides a method for the adaptive beamforming processor by defining the amplitude and phase of acoustic signals as they propagate across the sensor elements of the array of the beamforming processor for each array's incident angle of interest. The invention provides a data-based technique that improves the definition of the amplitude and phase parameters of acoustic signals, as they propagate across an array of sensor elements, for each array incident angle of interest. The appropriate data-based definition of the acoustic signal is then used to constrain adaptive noise suppression algorithms from canceling acoustic signals in the desired incident (or steering) direction. The use of this technique, within an adaptive-array-beamforming-processor, results in an improvement in the ability to detect acoustic signals imbedded in noise. The method of the present invention may be further described with reference to FIG. 2.

Figure 2:
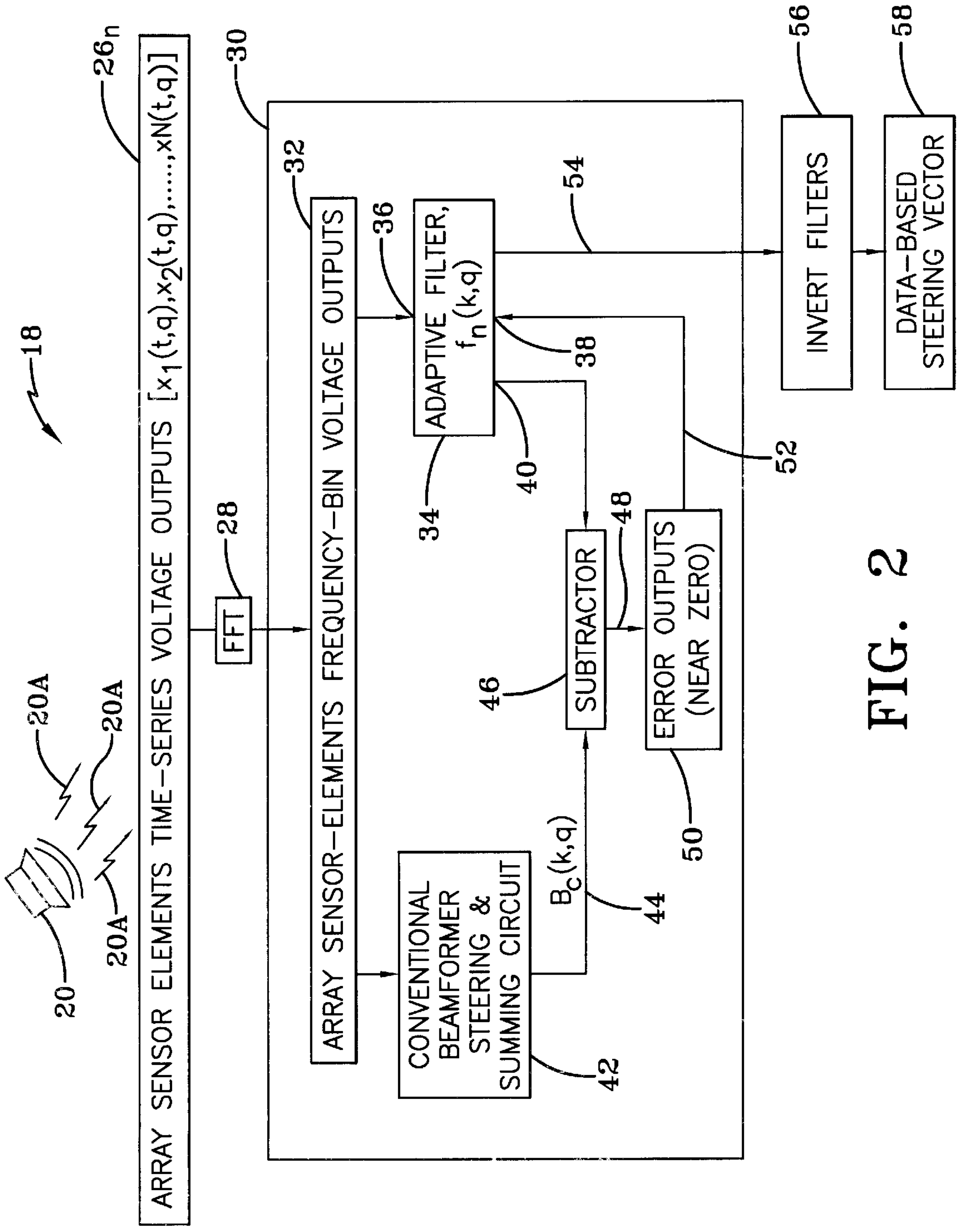
FIG. 2 illustrates the data flow associated with the method of the present invention.

FIG. 2 illustrates the data flow of the method 18 of the present invention as utilizing an actual signal source for detection that is present at a given incident direction with all directions having noise. The signal source 20 provides for an acoustic signal, shown as 20A, that is directed at array sensor elements 26$_n$ which, when combined with noise, provide for time-series voltage outputs represented by expression (1), and which is given by:

$$X_n(t,q)=[x_1(t,q),x_2(t,q), \ldots ,xN(t,q)] \tag{1}$$

where n represents each array sensor, t represents time, q represents the incident direction for the respective sensor element 26, and N represents the total number of sensor element included in the array sensor elements 26$_n$.

The output voltages of expression (1) are converted to frequency bins, in a manner known in the art, preferably by conventional Fast Fourier Transformations (FFTs) 28. The frequency bins output voltages are routed to the generator filter arrangement 30. More particularly, the frequency-bin voltage outputs for each sensor element of the array sensor elements 26$_n$ are generally identified in FIG. 2 by reference number 32. Although the description of FIG. 2 is applicable to the multiple sensor elements making up array sensor element 26$_n$ only single data paths are shown in FIG. 2. Each array sensor element frequency-bin output voltage 32 is routed to an adaptive filter 34, in particular, input 36 thereof. The input voltages are identified in FIG. 2 represented by expression (2), which is given by:

$$X_n(k,q)=[x_1(k,q),x_2(k,q), \ldots ,xN(k,q)] \tag{2}$$

where k represents the frequency bin of the respective sensor element of the array sensor element 26$_n$, and quantities q and n are as given for expression (1).

The adaptive filter 34 has a response that is represented by expression (3) which is to be further discussed, and which is given by:

$$f_n(k,q)=\frac{\overline{x_n(k,q)*B_c(k,q)}}{\overline{x_n(k,q)*x_n(k,q)}} \tag{3}$$

where n represents each sensor element, k represents each frequency bin q represents the incident direction of the respective sensor element, $B_c$ represents a beam formed by conventional procedures, * denotes a complex conjugate of the quantity $x_n$, and the bar-like symbol over each of the numerator and denominator of expression (3) denotes time average.

The response given in expression (3) of the adaptive filter 34 is sometimes referred to the Wiener solution, more fully discussed in the technical article of B. Widrow, J. R. Glover Jr., J. M. McCool, J. Kaunitz, C. S. Williams, R. H. Hearn, J. R. Zeidler, E. Dong Jr., and R. C. Goodlin, entitled *"Adaptive Noise-Cancelling: Principles and Applications,"* Proceedings of the IEEE, vol. 63, pp. 1692–1716, December 1975, and herein incorporated by reference.

Each adaptive filter 34 has a second input 38 and provides an output 40 carrying a filtered voltage to the subtractor 46 of each respective sensor element of the array sensor elements 26$_n$.

The array sensor elements frequency bin output voltages 32 are also routed to the input of steering circuit 42 which is a conventional beamforming processor and is known in the art. The steering circuit 42 provides a single output 44 which is interrelated to a respective output of the adaptive filter 34 and which is the quantity represented by expression (4), and which is given by:

$$B_c(k,q) = \sum_{n=1}^{N} x_n(k,q) e^{-i\phi_n(k,q)} \tag{4}$$

where the quantity $x_n(k,q)$ is defined in expression (2), and $\phi_n$ (k,q) are the phase delays that steer the conventional beam.

The single output 44 of a steering circuit 42, as well as single output 40 of each adaptive filter 34, are routed to a subtractor 46.

The subtractor 46 subtracts the representative output 40 of the adaptive filter 34 from the interrelated and representative output 44 of the steering and summing circuit 42 so as to produce error outputs 48. The error outputs of the subtractor 46 (also corresponding to the output of box 50) is routed, via signal path 52, to the second input 38 of the adaptive filter 34. The error feedback circuit 52 serves to update the adaptive filter for each subsequent time average to produce the result of equation (3). The adaptation continues until the subtraction produces error outputs (one related to each sensor element of the array sensor elements 26$_n$) that approach that of near zero as identified by box 50.

The adaptive filter 34 operates in accordance with its response given in expression (3) so as to produce quantities $f_n$ that are routed on signal path 54 to an invert filter 56, which provides an inverse characteristic of its inputted quantity $f_n$. The inverse of the response quantities $f_n$ of each adaptive filter provided by each invert filter 56 serves as data-based steering vectors 58. Relative to prior art, each of the data-based steering vectors 58 better represents the in situ amplitude and phase of the acoustic signals of the array provided by the adaptive filter 34 used to accomplish the method of the present invention.

The system and method of the present invention uses the actual signal for detection that is directed onto all sensor elements 26$_n$ that are inputs of the conventional beamformer 42 and which are applied to N adaptive filters 34. The filtered sensor element, that is, output of adaptive filter 34 for the associated sensor element of the array sensor elements 26$_n$, is placed at output 40 of the adapter filter 34 and the output 44 of the steering circuit 42 representative of that of a conventional beam without the benefits of the present invention are subtracted from each other by subtractor 46 so as to provide a feedback signal on signal 52 that is routed to the second input of the adaptive filter 34. The adaptive filter 34 is updated based upon the feedback signal and this process is continued until an output of subtractor 46 approaching near zero is provided that is applied on signal path 52.

For each frequency bin of the array sensor elements frequency bin voltage outputs 32, the response quantity $f_n$ of each adaptive filter 34 is the time average of the product of the conjugate of the sensor element for each of array sensor elements 26$_n$ with the conventional beam divided by the time average of the product of the sensor element with its conjugate, as shown in expression (3). When the adapter filter 34 has converged with time, the error output of the subtractor 46 should be nearly zero and the filtered sensor element represented by the output of the adaptive filter 40 is nearly identical to the output of the conventional beam 44.

The generator filter arrangement 30 of FIG. 2 handles each sensor element of the array sensor elements 26$_n$ used in the adaptive array beamforming processor of the present invention. The converged states of adaptive filter 34 provide the desired response quantity $f_n$ for each sensor element of the array sensor element 26$_n$ at each incident angle and at each frequency bin. Relative to prior art, the inverse of these converged states, resulting from the operation of invert filter 56, more accurately define the acoustic amplitude and phase of the acoustic signals appearing across the array.

Figure 1:
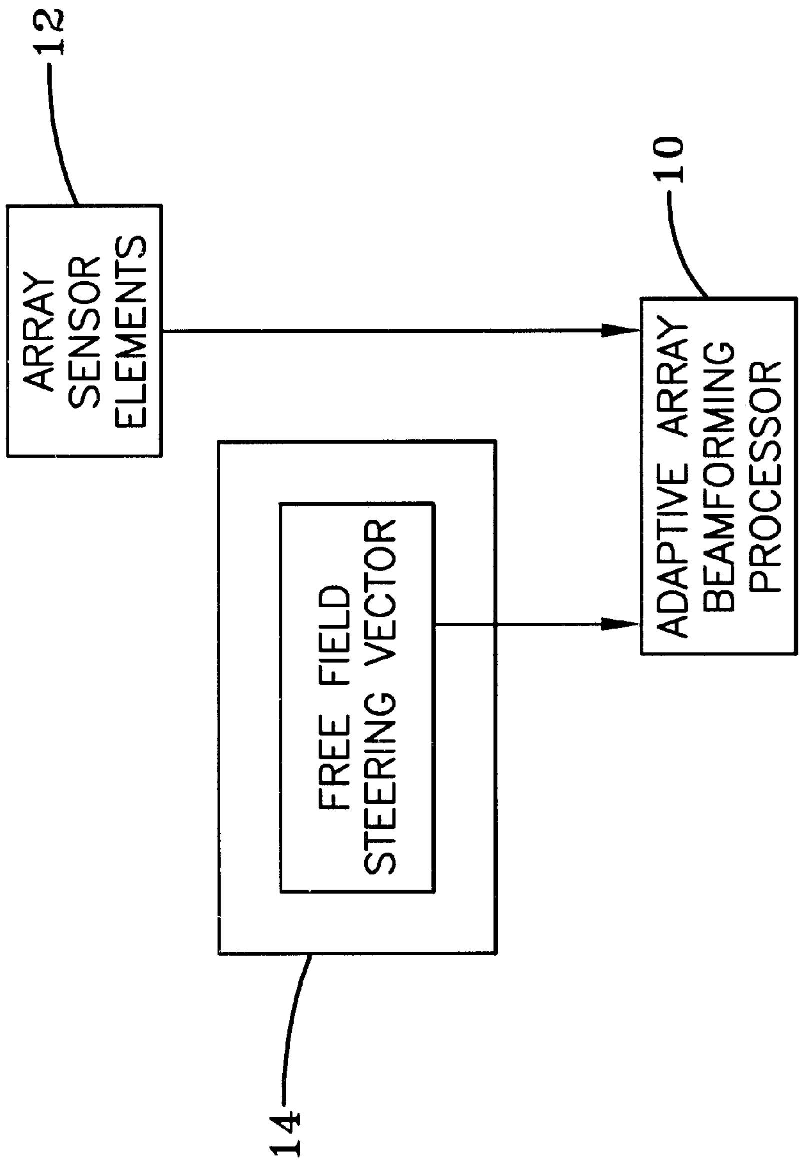
FIG. 1 PRIOR ART
FIG. 1 is a block diagram of a prior art adaptive-array-beamforming-processor.
Figure 3:
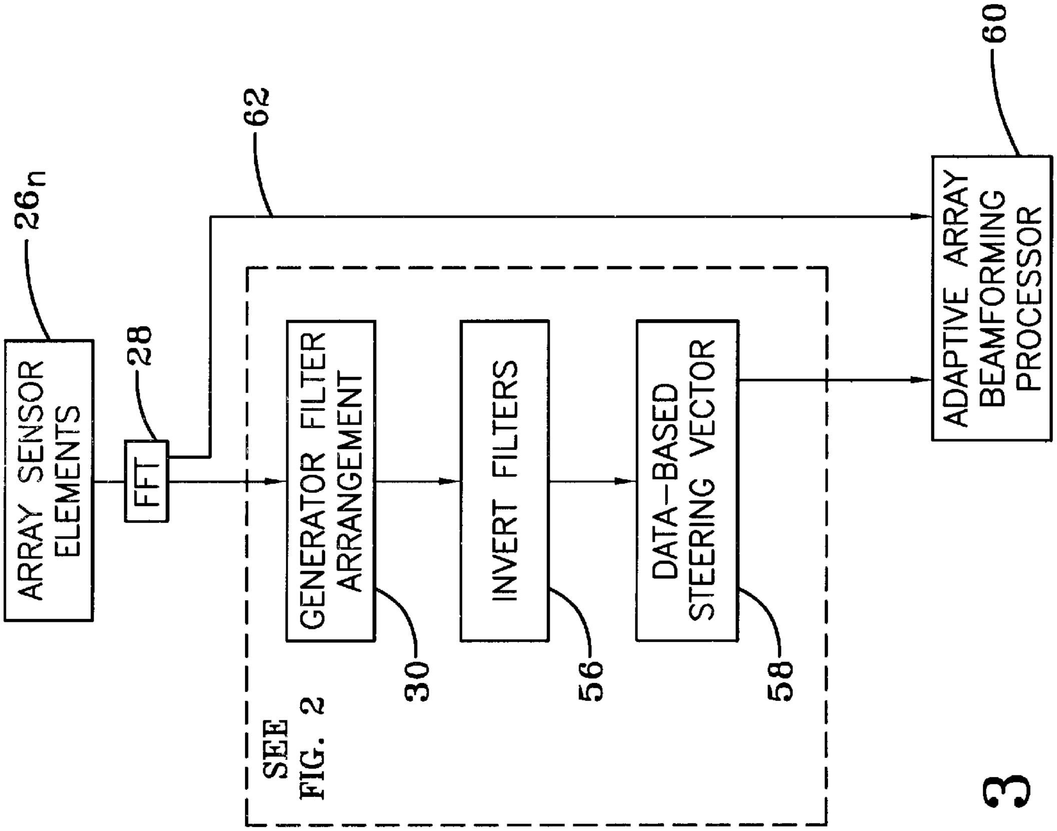
FIG. 3 is a block diagram of the overall operation of the adaptive-array-beamforming processor of the present invention.

In the practice of the present invention, and as seen with reference to FIG. 3, the output of each invert filter 56, that is, the inverse of each converged adaptive filter 34 output, that is, $f_n$ for each array sensor element at each incident angle and each frequency bin is then used to define the data-based steering vectors 58. During the process of detecting acoustic signals, the computed data-based steering vectors 58, in conjunction with outputs directly from the array sensor elements FFT 28, are applied to an adaptive-array-beamforming-processor 60 for all frequency bins in the desired incident direction. That is to say, data-based steering vectors 58 are used within beamforming processor 60 in place of the prior art free-field based steering vector arrangement 14, FIG. 1, and the frequency bin voltages from FFT 28 are applied as a separate input to beamforming processor 60, via a direct path 62. When the acoustic signal arrives in the steered beam direction with a high signal to background noise ratio (SNR) the signal definition is exact.

At lower SNRs, the signal will be only partially maintained because of the influence of noise. However, in steering directions with no signal and given a largely uncorrelated noise field, noise will be reduced (relative to that of a free-field-based signal definition described with reference to FIG. 1) in proportion to the number of constituent sensor elements in a beam. The benefit of the data-based constraint provided by the data-based steering vectors 58 of the present invention is that in directions where there is signal, the signal is partially preserved and in adjacent directions with noise only, noise is greatly reduced. The additional fidelity provided by the data-based signal definition technique of the present invention using the data-based vectors 58, enables improved detection of signals imbedded in noise.

It should now be appreciated that the practice of the present invention provides for a method that defines amplitude and phase parameters of the acoustic signals that propagate across the sensor elements of an array of an adaptive beamforming processor for each sensor element and for each incident angle of interest. These inverted filter quantities, relative to prior art, better represent the amplitude and phase of the actual acoustic signals for detection.

More particularly, in that the acoustic signal definition is based on inverted filter quantities 58 that better correct for phase and amplitude deviations inherent in an actual array system, the result is increased signal gain at the output of the adaptive beamforming processor 60 during operations. In accordance with the methods and the operating routines of the present invention, the unwanted acoustic signal cancellation is reduced and the noise attenuation from noise-only directions increased. In turn, the ability to extract acoustic signals from noise is greatly enhanced. Thus, the performance of beamforming-processors are correspondingly improved.

It should now be appreciated that the practice of the present invention provides for a beamforming-processor that uses the output voltages of sensor elements to define filters that, when inverted, yield appropriate signal definitions that improve the accuracy of the adaptive-beamforming-processor.

It will be understood that various changes and details, steps and arrangement of parts and method steps, which have been described and illustrated in order to explain the nature of the invention, may be made by those skilled in the art within the principle and scope of the invention as expressed in the appending claims.

What is claimed is:

1. A method for defining amplitude and phase parameters of acoustic signals that propagate across sensor elements of an array of a beamforming processor for each array incident angle of interest, said beamforming processor having a steering and summing circuit, said signal definition method comprising the steps of:

routing the output of each sensor element as first inputs to an adaptive filter having second inputs and having representative outputs, and to the steering and summing circuit of the beamforming processor having representative outputs interrelated to said representative outputs of said adaptive filter;

subtracting the representative outputs of said adaptive filter from the interrelated and representative outputs of said steering and summing circuit so as to produce representative error outputs that are respectively routed to said second inputs of said adaptive filter;

said error outputs approaching near zero which yield filter quantities, $f_n$, one for each sensor element; and inverting each $f_n$ quantity so as to provide representative data-based steering vectors for said beamforming processor.

2. The method according to claim 1, wherein said output signals of each of said sensor are converted to frequency bins.

3. The method according to claim 2, wherein said output signals are converted to frequency bins by the use of Fast Fourier Transformations (FFTs).

4. The method according to claim 1, wherein said filter quantity, $f_n$, is represented by the expression given by:

$$f_n(k, q) = \frac{\overline{x_n(k, q) * B_c(k, q)}}{\overline{x_n(k, q) * x_n(k, q)}}$$

where n represents one of the sensor elements, k represents the frequency bin, q represents the incident direction of the respective sensor element, $B_c$ represents a beam formed by conventional procedures, $x_n$ represents the combined signal and noise voltage output of each sensor element, * denotes a complex conjugate of the quantity of $x_n$, and the bar-like symbol over each of the numerator and denominator of expression denotes time average.

5. A system for defining amplitude and phase parameters of acoustic signals that propagate across sensor elements of an array comprised of a beamforming processor for each array incident angle of interest, said beamforming processor having a steering and a summing circuit, said system comprising:

an adaptive filter having first and second inputs with the first input receiving the output signals of each of the sensor elements and having representative outputs;

a subtractor for subtracting the representative outputs of said adaptive filter from the interrelated and representative outputs of said steering and summing circuit so as to produce representative error signals that are respectively routed to said second inputs of said adaptive filter which, in turn, provides output signals defining filter quantities, $f_n$; and an inverting circuit for inputting a respective one of the filter quantities $f_n$, and providing an output with the outputs thereof representative of data-based steering vectors for said adaptive-beamforming-processor.

6. The system according to claim 5, further comprising a converter for converting said output signals of each of said sensors to frequency bins.

7. The system according to claim 6, wherein said output signals are converted to frequency bins by said converter using Fast Fourier Transformations (FFTs) analysis.

8. The system according to claim 6, wherein said representative output signal produced by subtraction of the output of the adaptive feedback circuit from the outputs of the steering and summing circuit approaches near zero.

9. The system according to claim 5, wherein said quantities, $f_n$, are developed by said adaptive filter that has a response that is represented by the expression given by:

$$f_n(k, q) = \frac{\overline{x_n(k, q) * B_c(k, q)}}{\overline{x_n(k, q) * x_n(k, q)}}$$

where n represents each sensor element k represents each frequency bin, q represents each incident direction of the respective sensor element, $B_c$ represents a beam formed by conventional procedures, $x_n$ represents the combined signal and noise voltage output of each sensor element, * denotes a complex conjugate of $x_n$, and the bar-like symbol over each of the numerator and denominator of expression denotes time average.

* * * * *